J. NEWTON.

METHOD OF SECURING CUTTERS TO ROTARY DISKS.

No. 2,728. Reissued Aug. 13, 1867.

THE NORRIS PETERS CO., PHOTO-LITHO., WASHINGTON, D. C.

United States Patent Office.

HENRY DISSTON, OF PHILADELPHIA, PENNSYLVANIA, AND JAMES E. ATWOOD, OF TRENTON, NEW JERSEY, ASSIGNEES BY MESNE ASSIGNMENTS OF JONAH NEWTON.

*Letters Patent No.* 13,096, *dated June* 19, 1855: *reissue No.* 2,728, *dated August* 13, 1867.

IMPROVED METHOD OF SECURING CUTTERS TO ROTARY DISKS.

The Schedule referred to in these Letters Patent and making part of the same.

TO ALL WHOM IT MAY CONCERN:

Be it known that we, HENRY DISSTON, of Philadelphia, Pennsylvania, and J. E. ATWOOD, of Trenton, New Jersey, are the owners of certain Letters Patent for Securing Cutters to Rotating Disks, granted to JONAH NEWTON, of the city of New York, on the nineteenth day of June, A. D. 1855; and we do hereby declare the following to be a full, clear, and exact description of the said invention, reference being had to the accompanying drawing, and to the letters of reference marked thereon.

The invention of the said JONAH NEWTON consists of a plate or disk having recesses, the edges of which represent segments of circles, and cutters or teeth adapted to and admitting of being so adjusted in these recesses that they can be readily fixed at the proper angle for acting on the wood with the best effect after the cutters had become worn by being sharpened; these teeth or cutters having ribs adapted to grooves in the recesses so as to prevent lateral displacement, and being secured to the disk by set-screws and segmental disks, or other equivalent fastenings, which will permit the aforesaid adjustment of the cutters.

In order to enable others skilled in the art to make this invention, we will now proceed to describe a mode of carrying it into effect, reference being had to the accompanying drawing, which forms a part of this specification, and in which—

Figure 1:
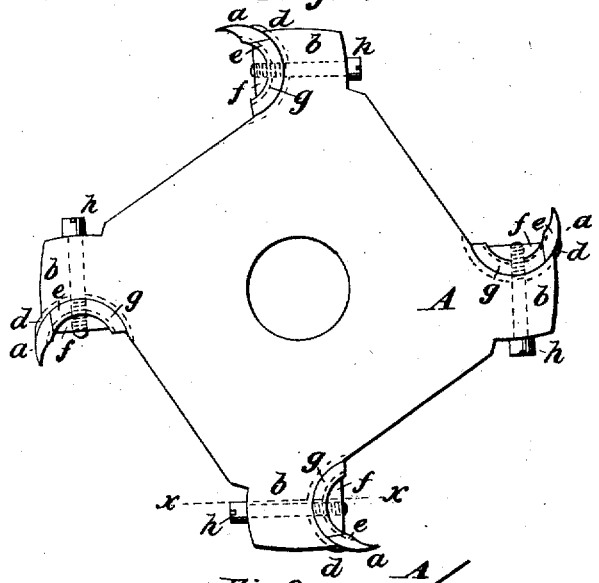

Figure 1 is a side view of the disk or plate, with four cutters or teeth attached to it.

Figure 2:
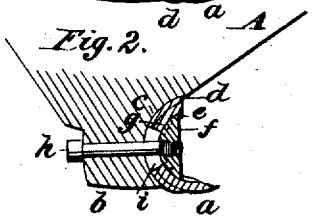
Figure 3:
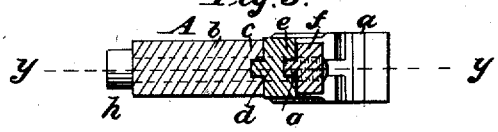

Figure 2, a longitudinal section on the line *y y*, fig. 3, of one of the cutters and a portion of the disk.

Figure 3, a transverse section of one of the cutters and a portion of the plate, on the line *x x*, fig. 1.

Similar letters refer to similar parts throughout the several views.

A represents the disk or plate to which the cutters or teeth are attached, the plate being secured as usual on a rotating shaft. Each cutter consists of a section of a flat ring of steel, the outer edge representing the segment of a circle corresponding to the segmental recess in the edge of the disk, which segmental recess forms in the present instance the front edge of a projection, *b*, there being in this case four such projections for receiving four cutters. A groove, *c*, is cut in each recess for the reception of a rib formed on the back of the cutter. The front edge of the cutter, excepting at and near the point, represents the segment of a circle, and is also grooved at *e* for the reception of a rib or ledge, *g*, on the segmental nut *f* of the set-screw *h*, which passes through the projection *b* and through a hole in the tooth or cutter sufficiently elongated to permit the said cutter to be adjusted in the arc of a circle.

The cutters are thus firmly secured to the disk or plate, and cannot be displaced laterally, owing to the rib on the back of the cutter fitting into the recess of the plate. After the points of the cutters have become worn by being sharpened, they can, after releasing the screws, be moved outwards so that the cutting edges can always be adjusted to the proper angle for acting on the wood, the screws being tightened after adjustment.

We claim as the invention of the said J. NEWTON, and desire to secure by Letters Patent—

1. A rotary cutter, consisting of a disk having recesses, which represent the segment of a circle, and teeth adapted to and admitting of being adjusted in these recesses, substantially as set forth for the purpose specified.

2. The tooth or cutter consisting of the segment of a ring, having on its convex side a rib adapted to a groove in the above-mentioned recess.

3. The screw *h* and segmental nut *f*, arranged for securing the tooth or cutter to the disk or plate, as set forth.

In testimony whereof we have signed our names to this specification before two subscribing witnesses.

HENRY DISSTON,
JAMES E. ATWOOD.

Witnesses:
JOHN WHITE,
C. E. FOSTER,
W. J. R. DELANY.